United States Patent [19]

Logan

[11] Patent Number: 4,591,999

[45] Date of Patent: May 27, 1986

[54] METHOD AND APPARATUS FOR AUTOMATICALLY SPACING CHARACTERS DURING COMPOSITION

[75] Inventor: David J. Logan, Glastonbury, Conn.

[73] Assignee: Gerber Scientific Products, Inc., Manchester, Conn.

[21] Appl. No.: 529,834

[22] Filed: Sep. 6, 1983

[51] Int. Cl.⁴ ........................ G06F 15/46; B41J 19/32

[52] U.S. Cl. .................................... 364/523; 33/18.2; 364/474

[58] Field of Search ............... 364/474, 523, 200, 900; 33/18 R, 18 B

[56] References Cited

U.S. PATENT DOCUMENTS

| | | | |
|---|---|---|---|
| 4,195,338 | 3/1980 | Freeman | 364/523 X |
| 4,257,711 | 3/1981 | Nakajima | 364/523 X |
| 4,342,096 | 7/1982 | McDewitt | 364/523 X |
| 4,367,588 | 1/1983 | Herbert | 33/18 R |
| 4,437,150 | 3/1984 | Dahlgren, Jr. et al. | 364/474 |

*Primary Examiner*—Felix D. Gruber

*Attorney, Agent, or Firm*—McCormick, Paulding & Huber

[57] ABSTRACT

In a computer implemented system for composing lines of text the spacing between each adjacent pair of characters is uniquely determined by processing, in accordance with a pregiven program, a number of digital "space" values related to the shapes of the facing sides of the involved characters. Starting with a uniform or near-uniform fundamental spacing between all adjacent pairs of characters the processing of the space values of a given pair of adjacent characters results in possible adjustments in this fundamental value to achieve a more aesthetically pleasing line of text. For each pair of adjacent characters the processing is a two-stage one with the first stage making an adjustment in the fundamental spacing if it is possible to overlap portions of the two characters and with the second stage making an adjustment which, aside from the possibility of overlapping, is dependent on the degree of openness or empty space present between the characters when fundamental spacing is used.

14 Claims, 15 Drawing Figures

FIG. 7
ABCDEFGHIJKLM
NOPQRSTUVWXYZ
abcdefghijklm
nopqrstuvwxyz

UPPER CASE HELVETICA

| Letter | Left column | Right column |
|---|---|---|
| A | 300, 200, 100, 0 | 300, 200, 100, 0 |
| B | 0, 0, 0, 0 | 50, 0, 0, 50 |
| C | 100, 0, 0, 100 | 100, 25, 25, 100 |
| D | 0, 0, 0, 0 | 50, 0, 0, 50 |
| E | 0, 0, 0, 0 | 0, 25, 25, 0 |
| F | 0, 0, 0, 0 | 0, 0, 50, 350 |
| G | 100, 0, 0, 100 | 100, 25, 0, 0 |
| H | 0, 0, 0, 0 | 0, 0, 0, 0 |
| I | 0, 0, 0, 0 | 0, 0, 0, 0 |
| J | 300, 50, 0, 50 | 0, 0, 0, 50 |
| K | 0, 0, 0, 0 | 50, 350, 350, 0 |
| L | 0, 0, 0, 0 | 399, 399, 0, 0 |
| M | 0, 0, 0, 0 | 0, 0, 0, 0 |
| N | 0, 0, 0, 0 | 0, 0, 0, 0 |
| O | 100, 0, 0, 100 | 100, 0, 0, 100 |
| P | 0, 0, 0, 0 | 50, 0, 50, 300 |
| Q | 100, 0, 0, 100 | 100, 0, 0, 100 |
| R | 0, 0, 0, 0 | 50, 0, 25, 0 |
| S | 50, 0, 0, 50 | 50, 0, 0, 50 |
| T | 0, 250, 250, 250 | 0, 250, 250, 250 |
| U | 0, 0, 0, 100 | 0, 0, 0, 100 |
| V | 0, 100, 200, 300 | 0, 100, 200, 300 |
| W | 0, 100, 200, 300 | 0, 100, 200, 300 |
| X | 50, 250, 250, 0 | 50, 250, 250, 0 |
| Y | 0, 50, 200, 300 | 0, 50, 200, 300 |
| Z | 0, 200, 50, 0 | 0, 50, 200, 0 |

LOWER CASE HELVETICA

| Letter | Left column | Right column |
|---|---|---|
| a | 400, 50, 0, 0 | 400, 50, 25, 0 |
| b | 0, 0, 0, 0 | 400, 50, 0, 50 |
| c | 400, 50, 0, 50 | 400, 50, 0, 50 |
| d | 400, 50, 0, 50 | 0, 0, 0, 0 |
| e | 400, 50, 0, 50 | 400, 50, 0, 50 |
| f | 100, 0, 50, 50 | 0, 0, 50, 50 |
| g | 400, 50, 0, 50 | 400, 0, 0, 0 |
| h | 0, 0, 0, 0 | 400, 50, 50, 0 |
| i | 0, 0, 0, 0 | 0, 0, 0, 0 |
| j | 50, 50, 50, 50 | 0, 0, 0, 0 |
| k | 0, 0, 0, 0 | 200, 50, 100, 0 |
| l | 0, 0, 0, 0 | 0, 0, 0, 0 |
| m | 400, 0, 0, 0 | 400, 50, 0, 0 |
| n | 400, 0, 0, 0 | 400, 50, 0, 0 |
| o | 400, 50, 0, 50 | 400, 50, 0, 50 |
| p | 400, 0, 0, 0 | 400, 50, 0, 50 |
| q | 400, 50, 0, 50 | 400, 0, 0, 0 |
| r | 400, 0, 0, 0 | 400, 0, 100, 200 |
| s | 400, 50, 0, 50 | 400, 50, 0, 50 |
| t | 50, 0, 50, 100 | 50, 0, 50, 0 |
| u | 400, 0, 0, 50 | 400, 0, 0, 0 |
| v | 400, 0, 100, 200 | 400, 0, 100, 200 |
| w | 400, 0, 75, 150 | 400, 0, 75, 150 |
| x | 400, 25, 150, 0 | 400, 25, 150, 0 |
| y | 400, 0, 50, 100 | 400, 0, 100, 200 |
| z | 400, 0, 100, 0 | 400, 0, 100, 0 |

FIG. 8

METHOD AND APPARATUS FOR AUTOMATICALLY SPACING CHARACTERS DURING COMPOSITION

BACKGROUND OF THE INVENTION

This invention relates to the art of composing lines of text from alphabetical, numerical and other similar characters, and deals more particularly with a method and apparatus for automatically, in a computer-implemented composing system, establishing through the processing of digital data an intercharacter spacing which varies from one pair of characters to another and which is dependent on the shapes of the characters, to produce a line of text of pleasing appearance.

The method and apparatus of this invention have been developed for use initially with an automated sign generator such as shown and described in copending U.S. patent application Ser. No. 401,722, filed July 26, 1982, now U.S. Pat. No. 4,467,525, and they are hereinafter described as applied to such device. However, the invention is not limited to such application and may instead find utility in many other computer-implemented systems involving the composition or generation of lines of text - particularly systems where the characters are generated from computer memory resident fonts of characters.

A problem in composing lines of text is that for a pleasing appearance various different spacings have to be used between different pairs of characters. The "proper" spacing between any two characters is a matter of judgment and in the past has often been controlled manually by the operator. For example, the automated sign maker defined by the above-identified copending patent application provides a standard spacing between each pair of characters, and the keyboard includes at least one "kern" key by means of which the operator can subtract incremental amounts from such standard spacing. In one actual embodiment of such sign maker two kern keys have been provided, one being a "$\frac{1}{4}$" kern and the other being a "$\frac{1}{8}$" kern. By pressing the "$\frac{1}{4}$" kern key, a given amount of spacing dependent on the selected character height is subtracted from the standard spacing between two given characters and by pressing the "$\frac{1}{8}$" kern key, another amount of spacing equal to one-half said given amount is subtracted from the standard spacing. Such manual editing of the intercharacter spacing is, however, time consuming and demanding of the operator and it is therefore the object of this invention to provide a method and apparatus for achieving aesthetically pleasing intercharacter spacing without need for operator intervention.

One obvious way to provide for automatic intercharacter spacing would be to provide a memory resident look-up table defining the intercharacter spacing to be used for each possible pair of characters of a font. However, since a font of characters normally includes at least a complete alphabet of upper-case letters, a complete alphabet of lower-case letters and a complete set of numerals and punctuation marks, such look-up table would be very large and unwieldy to use. A further object of the invention is therefore to provide for automated intercharacter spacing which avoids the use of a character pair look-up table but which nevertheless achieves, through digital processing, intercharacter spacings dependent on the shapes of the individual characters making up each character pair.

Other objects and advantages of the invention will be apparent from the following description and from the accompanying drawings.

SUMMARY OF THE INVENTION

The invention resides in a method for establishing the spacing between adjacent characters in a computer-implemented text generating system. A memory accessible by the computer stores a first set of data, such as stroke data, defining the shape of the characters and a second data set defining a plurality of space values related to the shape of each character at different heighth levels along its right and left sides. It also stores an in-run and out-run dimension for each character which dimensions are used to define a fundamental spacing for each character pair by adding the out-run of the left character to the in-run of the right character. In association with the generation of an adjacent pair of selected characters the right-side space values of the left character and the left-side space values of the right character are processed, along with the in-run and out-run dimensions, in accordance with a pregiven program to produce results dictating the spacing to be used between such characters.

In accordance with a more detailed aspect of the invention the program by means of which the space values are processed is a two-stage one. In one stage the space values are processed to provide a change from the fundamental spacing in the event the two characters are capable of being overlapped. In the second stage the space values are processed to provide an adjustment from the fundamental spacing dependent on the openness or empty space between the two letters under fundamental spacing conditions.

The invention still further resides in an apparatus for practicing the aforesaid method.

BRIEF DESCRIPTION OF THE DRAWINGS

FIG. 8 is a diagram showing exemplary space values for the upper-case and lower-case Helvetica letters of FIG. 7.

DETAILED DESCRIPTION OF PREFERRED EMBODIMENT

Figure 1:
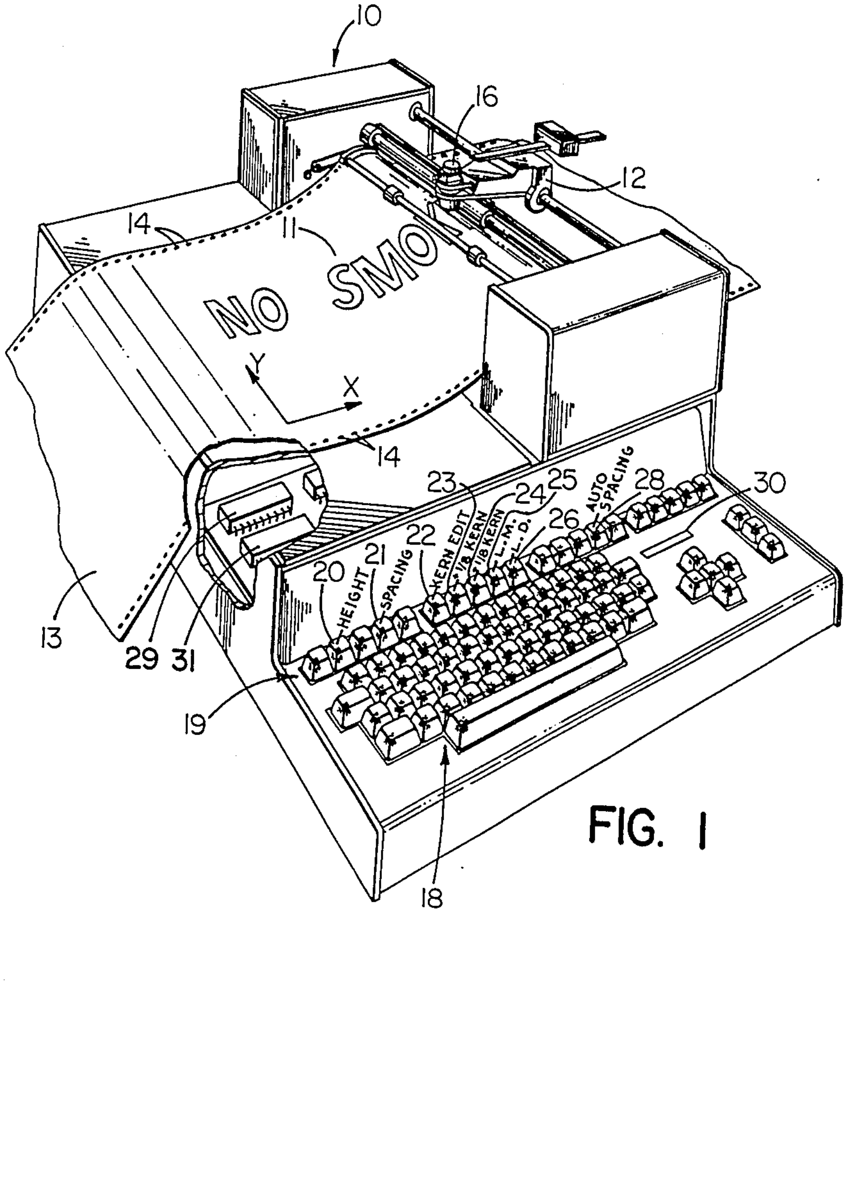
FIG. 1 is a perspective view of an automated sign generator embodying the present invention.

As previously mentioned, the invention may be employed in association with various different type composition devices but for purposes of illustration it is in FIG. 1 shown to be embodied in an automatic sign generating machine 10. The machine 10, except for including the automatic intercharacter spacing feature (AUTO-SPACE) of the invention and minor related changes described in detail hereinafter, is identical to the one described in copending patent application Ser. No. 401,722, which is incorporated herein by reference and to which reference may be had for further details.

For the present purposes it is sufficient to note that the machine 10 is one for plotting or cutting lines of text, such as indicated at 11, on a sheet material carrier 13. A tool head 12 is movable in the illustrated Y-coordinate direction and a pair of sprockets, not visible in FIG. 1, engage holes 14, 14 in the opposite longitudinal edges of the carrier 13 to move it in the X-coordinate direction. A computerized control, including at least one memory board 29 and a processor 31, within the machine 10 automatically moves the tool head 12 and the carrier 13 simultaneously in the X- and Y-coordinate directions to create the desired text characters on the carrier. In a plotting mode of operation the carrier 13 is a sheet of paper and the tool 16 carried by the tool head 12 is a pencil or other drawing implement so that the characters are drawn on the carrier, usually for the purpose of testing or checking the set up and functioning of the machine or making a trial run prior to a cutting operation. In a cutting mode of operation the carrier 13 is a sheet of laminated sign making material consisting for example of a top layer of thermoplastic vinyl releasably supported by means of a pressure-sensitive adhesive to a bottom support layer such as a layer of relative heavy paper coated with silicon, and the tool 16 of the tool head 12 is a cutter which functions to cut characters from the top vinyl layer of the carrier for eventual use in making a sign.

The machine 10 also includes a keyboard including a set of keys 18 through which characters to be included in a line of text may be selected and other information entered into the control system. Behind these keys 18 is another row of keys indicated generally at 19 and referred to as "function" keys through which various functions of the machine may be selected and set. For the present purposes it is sufficient to note that this row 19 of keys includes a "letter height" key 20, a "spacing" key 21, a "kern edit" key 22, a "$+\frac{1}{8}$ kern" key 23, a "$-\frac{1}{8}$ kern" key 24, a "length mode" key 25, a "length display" key 26 and an "AUTO-SPACE" key 28.

Through the use of the height key 20 the operator can enter any desired letter height within the limits of the machine 10. By pressing the height key 20 the machine is put into a height select mode and thereafter the operator can enter the desired height by operating the proper keys of the keyboard 18. After the height selection has been made a "return" key or another function key can be pressed to take the machine out of the height select mode and thereafter the characters will be generated at the selected height. In the memory board 29 or other data store in which the selected font of characters is stored is a height standard piece of data specifying the height standard of the stored character information. All of the information relating to each character of the font is stored at this height standard and when the information is read from the memory it is multiplied by an appropriate scale factor calculated by the control system's computer, to relate it to a character of the selected height. That is, the height standard of a stored font of characters may be one inch, which means that all of the stored data pertains to a one inch high character. If a letter height of two inches is selected by the operator then, in this case, all of the data read from the involved memory store is multiplied by a scale factor of 2, this including the data relating to each character's in-run and out-run dimensions and its space values, as hereinafter described.

The spacing key 21 is used to make a selection of overall intercharacter spacing referred to as "percentage spacing". As explained hereinafter the stored font information provides an initial or fundamental amount of spacing between all pairs of characters, and the AUTO-SPACE feature of this invention, if used, provides an adjustment in the fundamental spacing to take into account the shapes of the characters making up each character pair. By operation of the spacing key 21 the machine may be placed into a spacing select mode during which other keys of the keyboard may be operated to specify a desired percentage adjustment which affects all of the intercharacter spaces in the text line. That is, by selecting the proper percentage spacing all of the intercharacter spaces may be increased to spread apart the characters or all of the intercharacter spaces may be decreased to push the characters closer together. After a "percentage spacing" has been so specified a "return" key or other function key may be pressed to enter the selected value and thereafter it will be used in determining the intercharacter spacing at which the characters are generated. When the AUTO-SPACE feature is not used, the fundamental spacing is taken to involve a zero percent spacing adjustment and from this any other percentage adjustment can be made from −100% to +999%. Entry of −100% tells the system to remove 100% of the intercharacter spacing. An entered value of −50% will provide an intercharacter spacing which is equal to one-half the fundamental spacing. An entered value of +100% will provide an intercharacter spacing which is double the fundamental spacing, etc. If the AUTO-SPACE feature is used, the entered percentage spacing is used in a slightly different manner to produce substantially the same results, as explained in more detail hereinafter. In carrying out a percentage space adjustment, either with or without the AUTO-SPACE feature, only the intercharacter spacing is adjusted and no adjustments are made in the heighth or width of the characters.

The word "AUTO-SPACE" refers to the automatic intercharacter spacing feature of this invention. In the illustrated case, when the key 28 is pressed, the "AUTO-SPACE" feature is called for and added to the operation of the machine thereby causing the generated characters to be spaced in accordance with the shapes of adjacent pairs of characters to create a more attractive line of text. When the key 28 is thereafter pressed again the "AUTO-SPACE" feature is removed and is not included in the operation of the machine.

The provision of a function key, such as the key 28, to allow the AUTO-SPACE feature to be added or omitted at the will of the operator is not however essential. As an alternative the machine 10 may be designed without such a key and to be usable with font memory boards which include AUTO-SPACE data (that is, the character space values as hereinafter described) as well as with memory boards (such as those used with the machine of copending application Ser. No. 401,722) which do not include AUTO-SPACE data, with the machine automatically including the AUTO-SPACE feature when the AUTO-SPACE data appears on the accessed memory board and automatically not including such feature when the accessed board does not include AUTO-SPACE data.

With the "AUTO-SPACE" feature in operation a generated line of text should have a spacing entirely satisfactory to the operator. However, if desired the operator can make further adjustments in the spacing or can make adjustments in the spacing of a line of characters generated without the "AUTO-SPACE" feature through the use of the kerning keys 22, 23 and 24. Editing by way of the kerning keys 22, 23 and 24 takes place after all other parameters specifying a line of text have been entered, except for a line length parameter as described below. The kerning feature provided by the keys 22, 23 and 24 operates basically in the following way. First, through the operation of the proper keys a line of text to be generated is entered into the machine and the line is plotted onto a carrier sheet. The operator then checks the drawn line to see if any changes should be made in the spacing between any combination of two characters. If the operator decides that the spacing between a given combination of two characters should be changed he then presses the "kern edit" key 26 and then presses other of the keys 18 to call up the involved combination of characters which will appear in a display 30. The operator can then change the spacing between this combination of characters, at all of its occurrences in the line of text, by operation of the keys 23 and 24. Each operation of the "$-\frac{1}{8}$ kern" key 23 incrementally shortens the spacing between the characters, whereas each operation of the "$+\frac{1}{8}$ kern" key 24 incrementally increases the spacing. After the operator has entered the desired kern value between the involved combination of characters, he presses a return key or another function key and thereafter the manually entered kern value will be included in the subsequent generation of the line of text.

As explained in the aforementioned pending patent application the characters drawn or plotted by the machine 10 are produced from fonts of characters stored in a memory board 29, or other data store, associated with the machine's computerized control system. A number of different memory boards, each storing a different font of characters, may be included in the machine to allow a selection of different styles of characters to be generated by the machine. Among other things, each memory board stores "kern" data describing the incremental displacement by which the intercharacter spacing is to be changed by each depression of one or the other of the kern keys 23 and 24.

The "length-mode" key 25 and the "length display" key 26 provide a means for controlling the length of the generated line of text. While the "spacing" key 21 and the kern keys 22, 23 and 24 permit control of intercharacter spacing, the "length" keys 25 and 26 allow for changing the overall length of the line of text by proportionally compressing or expanding the width of the characters as well as the intercharacter spaces, without changing the heighth of the characters.

The "free length" of a line of text is the length of the line without any length adjustment. That is, the "free length" reflects the selected spacing percentage, the inserted kern amounts, the selected character heighth, and intercharacter spacing adjustments made by the "AUTO-SPACE" feature of this invention, and is recalculated whenever any of these are changed. The control of the machine 10 is set up so that a line length adjustment is made in the following way. First, the "length-mode" key 25 is used to select and display, in the display 30, the present mode of length control. If the key 25 is pressed once the display will read "free" and the system will be in the "free" mode. When the key is pressed again, the display will show "forced" and the system will be in the "forced" mode; and when the key is pressed once again the display will show "%" and the system will be in the "percentage length" mode. The "length display" key 26, when pressed, switches the display 30 to the value of the text length in the selected mode.

To effect a line length adjustment on an actual line of text the operator first enters a sequence of characters, and other parameters, specifying a desired line of text into the system through the use of the keyboard 18 and function keys 19. The length mode key 25 is then pressed the number of times required until the word "free" appears in the display 30 indicating the machine to be in the "free" mode. The operator now presses the "length display" key 26 and a number will appear in the display 30 representing, in inches, the free length of the entered line of text. This means that the line of text, when drawn, will have a length in inches equal to the number displayed by the display 30, such length being the length of the line from the left edge of the left-most character to the right edge of the right-most character—that is, with no in-run or out-run dimension included at either end of the text line.

To change the length of the text line to a "forced" length, the operator now again presses the "length mode" key 25 until the display 30 shows the word "forced" and then again presses the "length-display" key 26. The display 30 will now again initially redisplay the free length of the line but this can be replaced by a new entry, representing the desired forced length, by entering a new value through the keys 18. After the desired forced length has been so entered a return key is pressed and thereafter the line of text when generated will be generated so as to have an overall length equal to that forced length dimension entered by the above process. In making such a forced length adjustment the machine control divides the forced line length by the free line length to obtain a line length scale factor and thereafter all horizontal data information is multiplied by such scale factor to expand or contract each character and each intercharacter spacing.

Another, second way of making a line length adjustment is through the use of the "percentage length" mode. In this case after a sequence of characters representing a line of text have been entered into the system, the "length mode" key 25 is pressed the required number of times until the words "percent length" appear in the display 30. The "length-display" key 26 is then pressed and the display 30 will show "100%" indicating that no percentage length adjustment has as yet been made. To make a percentage length adjustment the desired percent of adjustment is entered through the keys 18 and the "return" key is pressed. Entry of "80" causes the machine to thereafter draw the entered line of text at eighty percent of its free length. Entry of "160" will cause the machine to thereafter draw the entered line of text at a length sixty percent longer than its free length.

Figure 2:
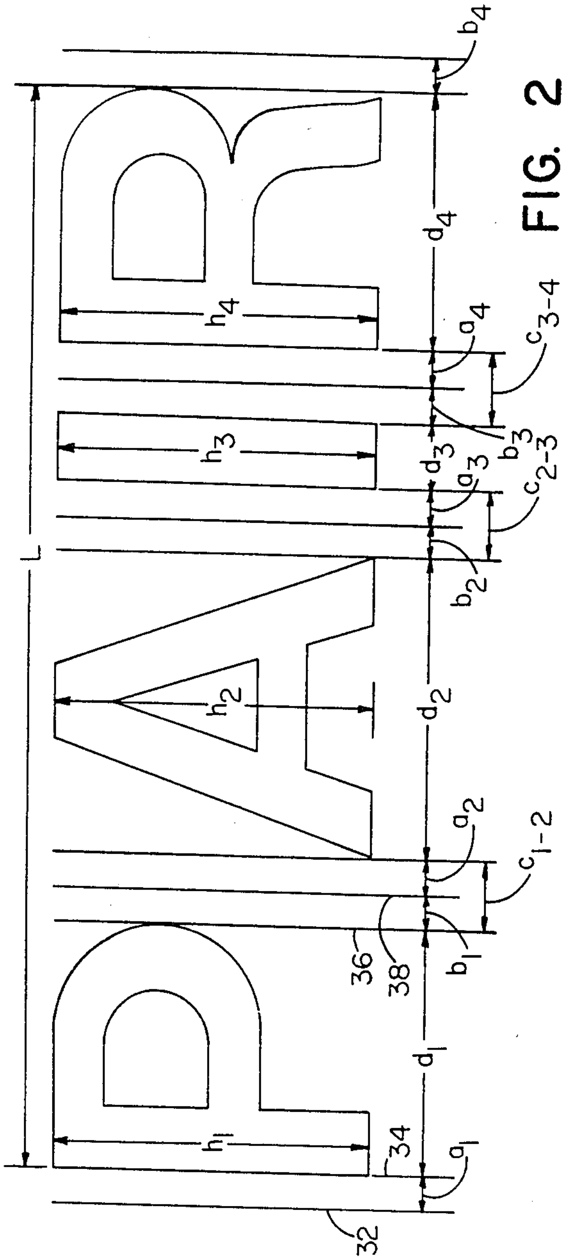
FIG. 2 is an illustration of a line of text having a uniform spacing between characters.
Figure 3:
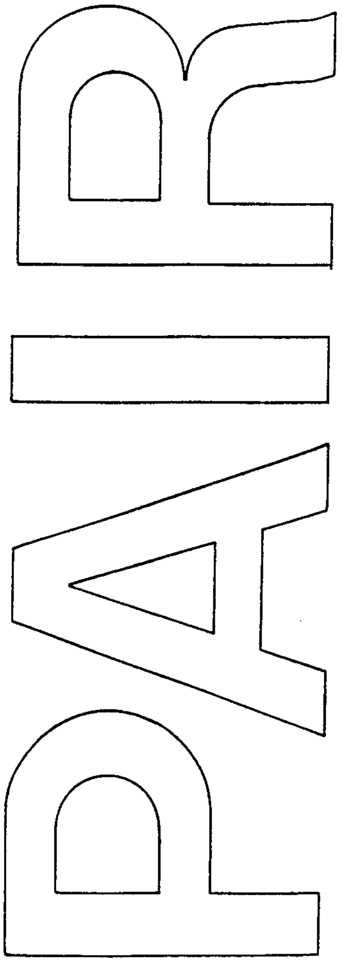
FIG. 3 is an illustration of a line of text having an intercharacter spacing such as achieved by the method and apparatus of this invention.

FIGS. 2 and 3 show, by way of example, a comparison of a line of text generated without the AUTO-SPACE feature of this invention (FIG. 2) and the same line generated with such feature (FIG. 3). FIG. 2 also shows various dimensions associated with the text line. Referring to this figure, each character has a heighth dimension h and a width dimension d. Each character also has associated with it an in-run dimension a and an out-run dimension b. The in-run dimension a is the horizontal distance between a line 32 spaced to the left of the character and another line 34 passing through the left-most extremity of the character, while the out-run dimension b is the horizontal distance between a line 36 passing through the right-most extremity of the character and a line 38 spaced to the right of the character. The lines 32, 34, 36 and 38 are all drawn at the slant angle of the characters. In the illustration the characters have no slant and therefore the lines 32, 34, 36 and 38 are vertical ones. The heighth h, width d, in-run a and out-run b for each character is stored in the font memory board at a given heighth standard and the actual values of these dimensions as used in the finally generated character are obtained by multiplying the stored values by the scale factor needed to achieve the character heighth selected by the operator. For a given selected nominal character heighth the heighths of the individual upper-case characters are approximately equal to one another, although in a typical font characters having rounded top or bottom portions such as the characters "O", "C" and "G" may be slightly larger in height than characters with non-rounded top or bottom portions such as the characters "N", "I" and "E". The lower case characters, due to ascenders and decenders, may have substantially different heighth values from one character to the next, and in both upper-case and lower-case the width dimension d of a character may vary greatly from one character to another. The in-run dimension a and the out-run dimension b of a given character may differ from one another and also may be different from one character to another. However, in a typical font, and as preferred in the practice of the present invention, the in-run and out-run dimensions of each character are equal to one another and among the different characters such in-run and out-run dimensions are equal to one another or very nearly equal to one another. That is, for example, in the illustrated case of FIG. 2: $a_1=b_1$; $a_2=b_2$; $a_3=b_3$; and $a_4=b_4$, and $a_1$, $a_2$, $a_3$, $a_4$ are all equal or very nearly equal to one another.

With the given in-run and out-run dimensions of FIG. 2 a fundamental spacing between characters is obtained by starting the in-run of one character at the end of the out-run of the character to its left. That is, the fundamental intercharacter spacing $c_{1-2}$ between the first and second characters is made up of the out-run $b_1$ of the first character and the in-run $a_2$ of the second character. Preferably, the fundamental spacing between a pair of adjacent characters is about 15% of the character height. Therefore, for one inch high characters the in-run of each character may be 0.075 inch and the out-run likewise 0.075 inch. The length L of the line of text is the distance between the left-most extremity of the first character and the right-most extremity of the second character and does not include the in-run dimension $a_1$ of the first character or the out-run dimension $b_4$ of the last character.

Because the in-run and out-run dimensions from character to character are essentially equal to one another the fundamental intercharacter spacings, such as illustrated at $c_{1-2}$, $c_{2-3}$ and $c_{3-4}$ are equal or very nearly equal to one another and produce a character spacing as illustrated in FIG. 2.

As can be seen by comparing FIG. 2 with FIG. 3, the fundamental spacing of FIG. 2 seems to leave too much space between some pairs of letters, such as between the "PA" pair and the "AI" pair, and a more pleasing line of text can be had, as in FIG. 3, by shifting some of the letter pairs closer to one another than they are with the fundamental spacing.

The "AUTO-SPACE" or automatic intercharacter spacing feature of this invention provides a means whereby a spacing such as typified by FIG. 3 and which is dependent on the shapes of the characters may be achieved by the computerized control of the machine 10. This feature is based on digital "space values" added to each character as a part of the font stored in the associated memory board or other memory store and which digitally describe in an approximate way the shape of the right and left side of each character. The number of space values associated with each character may vary without departing from the invention. The larger the number of space values used the more accurately the shapes of the sides of the characters may be described, but the more complex becomes the processing of these values to arrive at spacing data. As a compromise the number of space values for each side of a character is preferably between three and eight. In the case described hereinafter and shown by way of example in FIGS. 4A to 4H, each character has associated with it eight space values, four ($L_1$ to $L_4$) for the left side of the character and four ($R_1$ to $R_4$) for the right side of each character. The space values for the right side of a character are chosen so as to represent, at least approximately and in a digital way, the shape of the right side of the character while the left side space values are likewise chosen so as to represent, at least approximately and in a digital way, the shape of the left side of the character. Having thus described the shapes of the right and left sides of each character in a digital way, in keeping with the invention this digital information is then used by the computer of the device 10 to exercise an adjustment over the intercharacter spacing based on the shapes of the facing sides of the two characters of each pair. That is, in arriving at a spacing between a pair of characters the right side space values of the left character are digitally processed with the left side space values of the right character in accordance with a pregiven program and along with the in-run and out-run dimensions of the characters to arrive at a spacing between the two characters based on their respective shapes.

Referring to FIGS. 4A to 4H, the space values (the numbers in parentheses) are related to the horizontal distances from a vertical perpendicular drawn at the associated right or left extremity of the character (drawn with no slant) to the character at four levels. The first level is the top line of the character. The second level is spaced from the top line by a distance equal to $\frac{1}{3}$ of the upper-case character heighth. The third level is spaced from the top line by a distance $\frac{2}{3}$ of the heighth of the upper-case character, and the fourth level is at the base line of the character. The four left-side space values and the four right-side space values of each character therefore can be stored as eight bytes of information in the memory board and each byte may for example consist of eight bits. These eight bits of each byte can in turn be used, for example, to provide a resolution of each space value of 0.002 inches allowing a 0.512 inch maximum value. These values in turn apply to a one-inch letter height and are scaled appropriately for other character heights.

Figures 4A, 4B, 4C, 4D, 4E, 4F, 4G, 4H:
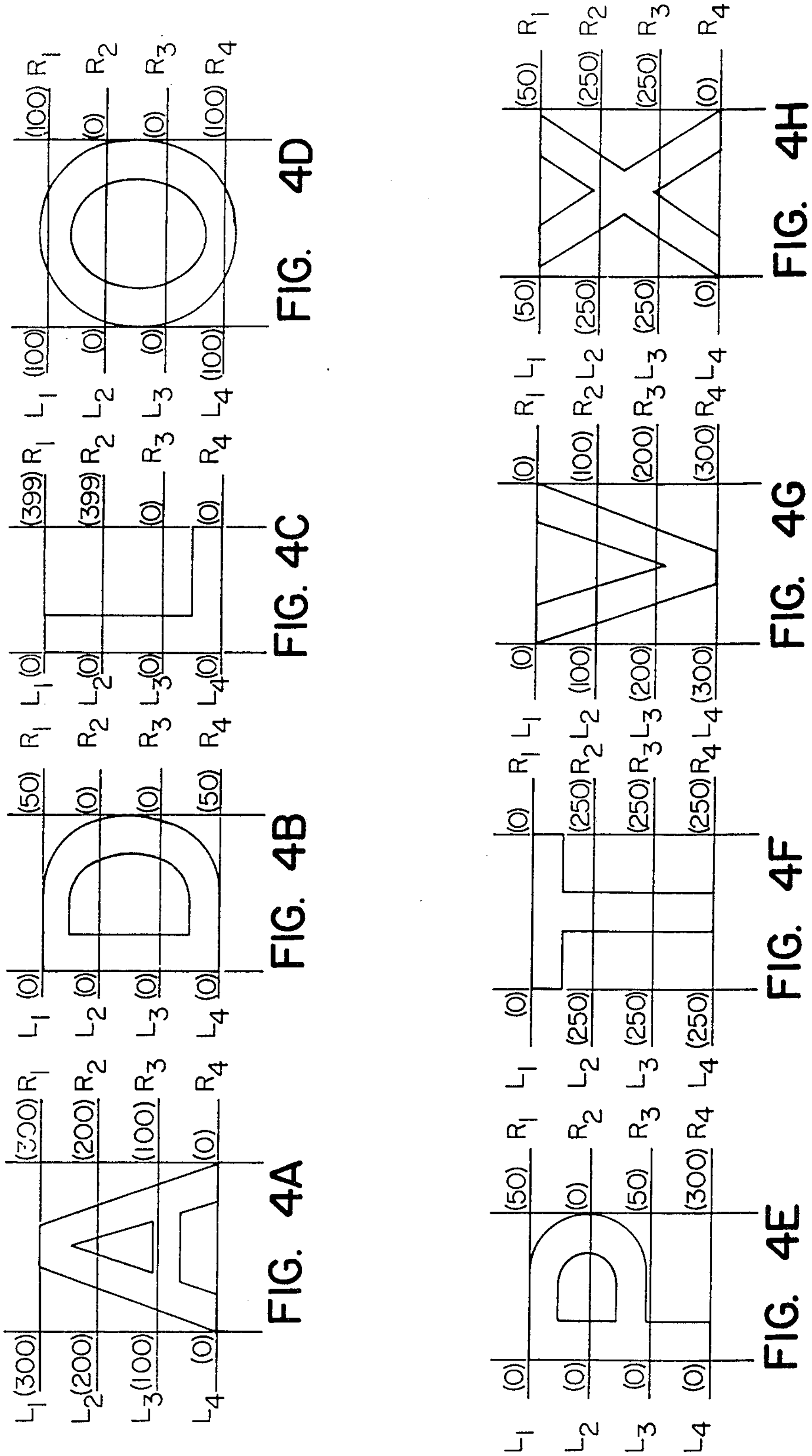
FIGS. 4A–4H are illustrations showing in an exemplary way the assignment of space values to various upper-case Helvetica characters.

FIGS. 4A, to 4H show the spacing values assigned to the upper-case letters A, D, L, O, P, T, V and X for upper-case Helvetica characters. The number chosen for each space value may be obtained by measuring the involved distance from the vertical extremity line to the adjacent character edge, but the number need not be an exact measured value and may in the judgment of the person assigning the space values differ from an exact measured value to take into account the fact that the four space values for each side of the character can give only a rough approximation of the shape of that side and the fact that a better approximation may sometimes be had by assigning something other than an exact measured number to a space value. For example, in the illustrated case of the letter "P" of FIG. 4E, the $R_3$ space value if an exact measured value were used should be about 300 whereas a better approximation of the shape of the right side of the character may be obtained by using the number 50 for the $R_3$ value.

Figure 7:
FIG. 7 shows a full alphabet of upper-case and a full alphabet of lower-case Helvetica characters.

Full alphabets of upper-case and lower-case Helvetica letters are shown in FIG. 7 and exemplary space values for them are shown in FIG. 8.

Having assigned digital space values to the right and left sides of each character of a stored font to give an approximation of the shape of each character side these digital values may then be processed along with the in-run and out-run dimensions and possibly other data, to provide intercharacter spacings taking character shapes into account. The particular routine used by the processor 31 for so processing the space values may vary without departing from the broader aspects of the invention. However, the presently preferred processing routine is a two-stage routine such as described below.

In the first stage of the preferred routine an investigation is made of the right-side of the left character and the left-side of the right character of a character pair, through the use of the space values, to see if the rightward extremity of the left letter and the leftward extremity of the right letter share a common level. If they do share a common level, and therefore cannot be partially overlapped, no adjustment is made in this stage. If they do not share a common level some adjustment from the normal spacing is made with the degree of such adjustment being based on further analysis of the involved space values.

More particularly, in the first phase of the spacing adjustment routine the space values for the right side of the left letter and for the left side of the right letter are added to one another across the four levels to produce four sums, one for each level. The smallest of these four sums is a "kern" amount in mils, to be subtracted from the fundamental spacing between the two characters. Exemplary calculations for this phase of the routine, using the space values of FIG. 8, for three different combinations of letters are as follows:

KERN AMOUNTS

For the AV pair:

| (A) Right Side | + | (V) Left Side | = | Sum |
|---|---|---|---|---|
| 300 | + | 0 | = | 300 |
| 200 | + | 100 | = | 300 |
| 100 | + | 200 | = | 300 |
| 0 | + | 300 | = | 300 |

Kern Amount = 300 or .3' (smallest sum)

For the AA pair:

| (A) Right Side | + | (A) Left Side | = | Sum |
|---|---|---|---|---|
| 300 | + | 300 | = | 600 |
| 200 | + | 200 | = | 400 |
| 100 | + | 100 | = | 200 |
| 0 | + | 0 | = | 0 |

Kern Amount = 0 (smallest sum)

For the OX pair:

| (O) Right Side | + | (X) Left Side | = | Sum |
|---|---|---|---|---|
| 100 | + | 50 | = | 150 |
| 0 | + | 250 | = | 250 |
| 0 | + | 250 | = | 250 |
| 100 | + | 0 | = | 100 |

Kern Amount = 100 or .1" (smallest sum)

Therefore, in the above examples the AV pair of characters will get a −0.3 inch kern amount (that is, its fundamental intercharacter spacing will be reduced by 0.3 inch), the AA pair will get no kern adjustment, and OX pair will get a −0.1 inch kern adjustment. These calculated kern amounts are again for a one inch letter heighth and if the characters are being generated at some other nominal height the kern amounts will be multiplied by the appropriate scale factor.

The second phase of the preferred spacing adjustment routine investigates, through an analysis of the right-side space values of the left character and the left-side space values of the right character the degree of "openness" or empty space between the character pair and makes a spacing adjustment (or no adjustment) based on such analysis. For this analysis, at each level, the space values for the right side of the left character and for the left side of the right character are added across the four levels, as before, to provide four sums associated respectively with the four levels. The kern amount, if any, previously determinied by the first phase of the routine is then subtracted from each level's sum. The four remaining values are then summed and this latter sum is then divided by one thousand. If the result of this division is larger than 0.5 it is truncated to 0.5. The value so obtained may be referred to as an "openness factor" and is a percentage by which the fundamental intercharacter spacing is reduced. This "openness" adjustment to the fundamental intercharacter spacing is in addition to any kern amount adjustment made by the first phase of the routine. That is, to obtain an intercharacter spacing fully adjusted for character shape, the fundamental intercharacter spacing is multiplied by the openness factor determined by the second phase of the routine. The value so obtained is then subtracted from the fundamental intercharacter spacing and this resulting spacing is then multiplied by a scale factor corresponding to the selected "percentage spacing", and the result of this multiplication then has subtracted from it the kern amount determined in the first phase of the routine to arrive at what may be called the "shape and percentage adjusted intercharacter spacing" or "Fs spacing" for the involved character pair. Such Fs spacing may then be "fine tuned" by the manual insertion or deltion of extra kern values through the keys 22, 23 and 24, although such "fine tuning" should seldom be required if proper space values are assigned to the characters.

By way of example, the "openness" factors for the AV, AA and OX letter pairs, using the space values of FIG. 8, are calculated as follows:

OPENNESS FACTORS

For the AV pair:

| Right side of Left Letter | + | Left side of Right Letter | = | Sum | − Kern Amount | = | Remainder |
|---|---|---|---|---|---|---|---|
| 300 | + | 0 | = | 300 | − 300 | = | 0 |
| 200 | + | 100 | = | 300 | − 300 | = | 0 |
| 100 | + | 200 | = | 300 | − 300 | = | 0 |

-continued

OPENNESS FACTORS

For the AV pair:

| Right side of Left Letter | + | Left side of Right Letter | = | Sum | − Kern Amount | = | Remainder |
|---|---|---|---|---|---|---|---|
| 0 | + | 300 | = | 300 | − 300 | = | 0 |
| | | | | Sum of remainders | | = | 0 |

Thus for the AV pair the openness factor is 0 and no openness correction is made.

For the AA pair:

| Right side of Left Letter | + | Left side of Right Letter | = | Sum | − Kern Amount | = | Remainder |
|---|---|---|---|---|---|---|---|
| 300 | + | 300 | = | 600 | − 0 | = | 600 |
| 200 | + | 200 | = | 400 | − 0 | = | 400 |
| 100 | + | 100 | = | 200 | − 0 | = | 200 |
| 0 | + | 0 | = | 0 | − 0 | = | 0 |
| | | | | Sum of remainders | | = | 1200 |
| | | | | 1200 div. by 1000 | | = | 1.2 |

Since maximum openness correction is arbitrarily limited to 0.5, in this case 0.5 is used as the openness factor. Since the openness factor is a percent value the fundamental intercharacter spacing is reduced by 50% (0.5) for the AA pair to obtain an openness adjusted fundamental spacing.

For the OX pair:

| Right side of Left Letter | + | Left side of Right Letter | = | Sum | − Kern Amount | = | Remainder |
|---|---|---|---|---|---|---|---|
| 100 | + | 50 | = | 150 | − 100 | = | 50 |
| 0 | + | 250 | = | 250 | − 100 | = | 150 |
| 0 | + | 250 | = | 250 | − 100 | = | 150 |
| 100 | = | 0 | = | 100 | − 100 | = | 0 |
| | | | | Sum of remainders | | = | 350 |
| | | | | 250 div. by 1000 | | = | 0.35 |

Thus, for the OX pair, the fundamental spacing is reduced by 35% to obtain the openness adjusted fundamental spacing.

For 1" Helvetica letters the fundamental spacing is 0.150 inch. The openness adjusted fundamental spacing for the OX pair would therefore be $(0.150)\times(1-0.35)=0.0975''$. If a 200% percentage spacing were called for this value would then be multiplied by 2 (the percentage spacing factor) and the kern amount would be subtracted from the result to yield the shape and space adjusted spacing (Fs spacing), that is: Fs=(openness adjusted fundamental spacing x percentage spacing factor)−(kern amount). In the case of this OX pair, therefore: Fs spacing$=(0.0975\times2)-0.1=0.095''$.

Short lower-case letters, that is those without ascenders, are approximately two-thirds the heighth of uppercase letters and require a special case. The top level space values for these short lower-case characters is set at 400 for both the left and right sides. This value is so large as to not result in any contribution to the kerning amount and the 400 value is recognized during the spacing adjustment calculating routine as a special case and is omitted from such calculations since lower case spacing should not be closed up just becaues the letters are short. Exemplary calculations for the av pair of characters and the Wa are as follows:

For the av pair:

| a | | v | | sum | Kern Amount | | |
|---|---|---|---|---|---|---|---|
| 400 | + | 400 | = | 800 | − 50 | = | 0 |
| | | | | | (400's not used) | | |
| 50 | + | 0 | = | 50 | − 50 | = | 0 |
| 25 | + | 100 | = | 125 | − 50 | = | 75 |
| 0 | + | 200 | = | 200 | − 50 | = | 150 |
| | | | | | Sum | = | 225 |

Kern amount = 50 or 0.050" (smallest sum).
225 div. by 1000 = 0.225 = openness factor, resulting in a spacing reduction of 22.5%.

For the Wa pair:

| W | | a | | Sum | Kern Amount | | |
|---|---|---|---|---|---|---|---|
| 0 | + | 400 | = | 400 | − 150 | = | 0 |
| | | | | | (400's not used) | | |
| 100 | + | 50 | = | 150 | − 150 | = | 0 |
| 200 | + | 0 | = | 200 | − 150 | = | 50 |
| 300 | + | 0 | = | 300 | − 150 | = | 150 |
| | | | | | Sum | = | 200 |

Kern amount = 150 or 0.150 (smallest sum).
200 div. by 1000 = 0.200 = openness factor, resulting in a spacing reduction of 20%.

Figure 5:
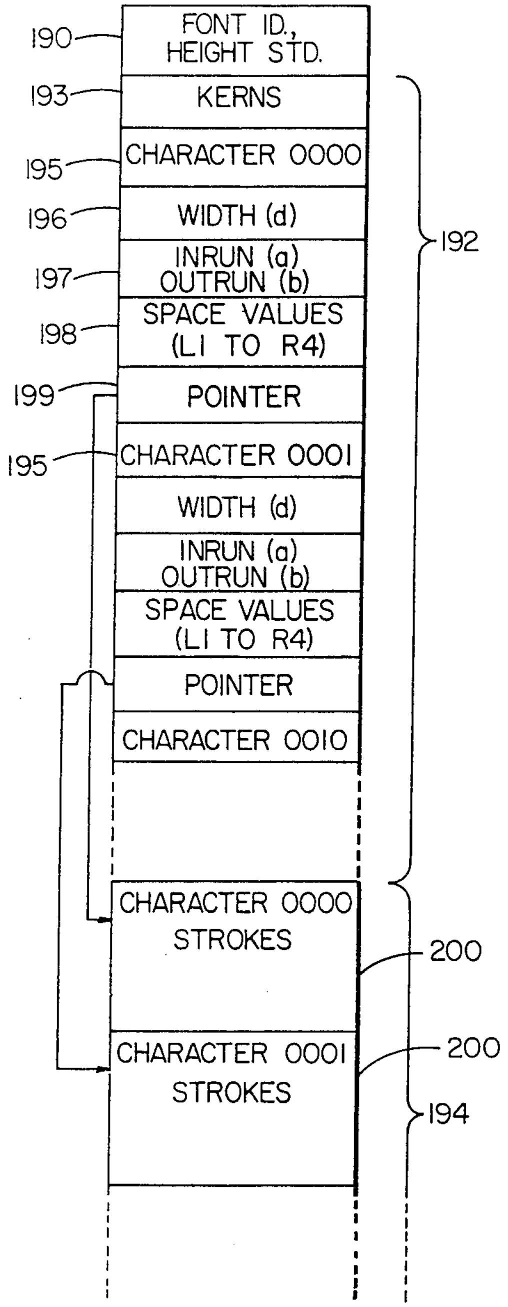
FIG. 5 is a schematic illustration showing the arrangement of the information stored in a font memory board of the device of FIG. 1.

FIG. 5 shows the manner in which the space values for the various characters of a font may be stored in a memory board or other data store. This illustrated arrangement of the data is similar to that shown in FIG. 16 of copending patent application Ser. No. 401,722, except for the addition of the space values. The particular location of the space values in the store is not critical to the invention, but in FIG. 5 the space value data for each character is shown to be located in the index portion of the store along with other data pertaining to that character.

A header portion 190 of the store contains an identifying code for the store and certain standardized information for all of the characters in that store as, for example, the heighth standard specifying the character heighth of the stored information. Following the header portion is the index portion 192 which includes kerning data, indicated at 193, specifying the incremental spacing achieved by each operation of the kerning keys 23 and 24. The major portion of the index 192 consists of a listing of each characters identifiers 195, 195 of the font together with other data pertinent to character and sufficient for use by the computerized control to make the above-identified intercharacter spacing adjustment calculations, to calculate the free length of a line of text after such spacing adjustments and to make forced length or percentage length adjustments in the line length. As shown for each character identifier 195 this pertinent data includes data 196 representing the width d of the character, data 197 representing the in-run and out-run of the character and data 198 representing the space values assigned to the character. As mentioned, the in-run dimension and the out-run dimension of each character are preferably equal to one another and, therefore, a single number may be stored in the index at 197 for each character to represent both its in-run and its out-run. For each character the index also includes pointer data 199 describing the location in the bulk data file 194 at which the stroke or vector values for that character are stored.

Another portion of the data store of FIG. 5 is the bulk data file 194 which stores information describing the strokes or vectors fully defining the shapes or profiles of each character and which data is used by the computerized control of the machine 10 to generate the desired characters on the carrier. This stroke or vector information 200 is obtained by digitizing a drawn archetype font of characters, and at the time such digitizing of the archetype font takes place the other data relevant to each character may also be obtained and stored in the data store.

Figure 6:
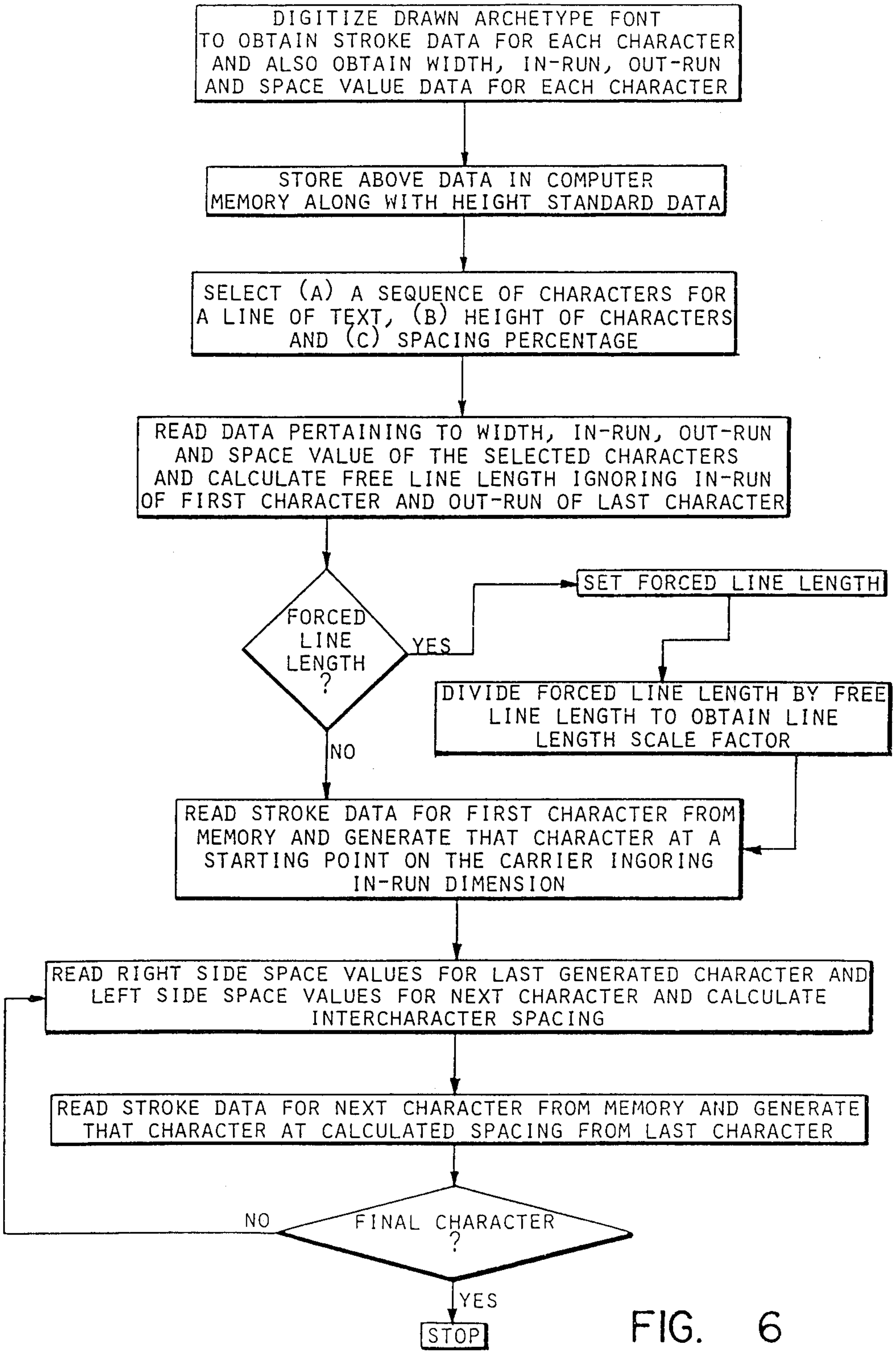
FIG. 6 is a flow diagram illustrating the method of the invention.

As a summary, FIG. 6 is a flow diagram showing in broad terms the entire process of the invention starting from the digitizing of the archetype font to the generation of the line of text on a carrier. In this flow diagram the possibility of making a percentage line length adjustment has been omitted for purposes of simplification and only the possibility of a forced line length adjustment has been shown.

I claim:

1. A method for establishing the spacing between adjacent characters in a system for generating text lines of characters through the use of a computer and an associated computer memory device, said method comprising:

providing a memory device storing data describing a font of characters of a given size and including for each such character a first data set defining the shape of the character and a second data set defining approximately the shape of the left side of the character by way of a plurality of left side digital values and the shape of the right side of the character by way of a plurality of right side digital values, said left side digital values being related to the shape of the left side of said character at respectively different levels along the height of said character and said right side digital values being related to the shape of the right side of said character at respectively different levels along the height of said character, reading from said memory device the data for a sequence of selected characters to be generated as a line of text, for each adjacent pair of selected characters of said sequence processing in said computer said plurality of right side digital values of the left character and said plurality of left side digital values of the right character in accordance with a program to produce spacing data, and generating a line of characters using for the generation of each character said first data set defining its shape and using for the space between each adjacent pair of characters said spacing data derived from said processing of said digital values.

2. The method of claim 1 wherein the number of left side digital values associated with each character is eight or less and wherein the number of right side digital values associated with each character is eight or less.

3. The method of claim 1 wherein the number of left side digital values associated with each character is four and wherein the number of right side digital values associated with each character is four.

4. The method of claim 1 wherein said memory device also stores data defining an in-run dimension and an out-run dimension for each character, and including said in-run and out-run dimensions of the involved characters in said processing of said right side and left side digital values to produce said spacing data.

5. The method of claim 4 wherein each character of said font has its out-run dimension equal to its in-run dimension.

6. The method of claim 5 wherein the in-run dimension of all said characters of said font are substantially equal to one another.

7. A method for establishing the spacing between adjacent characters in a system for generating text lines of characters through the use of a computer and an associated computer memory device, said method comprising:

providing a memory device storing data describing a font of characters of a given size and including for each such character a first data set defining the shape of the character and a second data set defining a plurality of space values at a number of different levels along the height of the character for both the left and right sides of the character, the space values for the left side of a character for each level being related to the horizontal distance between the perpendicular line drawn through the leftmost extremity of the character and the adjacent edge of the character, and the space values for the right side of a character for each level being related to the horizontal distance between the perpendicular line drawn through the rightmost extremity of the character and the adjacent edge of the character, reading from said memory device the data for a sequence of selected characters to be generated as a line of text, for each adjacent pair of selected characters of said sequence processing in said computer the right side space values of the left character and the left side space values of the right character in accordance with a given program to produce spacing data, and generating a line of characters using for the generation of each character said first data set defining its shape and using for the space between each adjacent pair of characters said spacing data derived from said processing of said space values.

8. The method of claim 7 wherein the number of left side space values associated with each character is eight or less and wherein the number of right side space values associated with each character is eight or less.

9. The method of claim 7 wherein the number of left side space values associated with each character is four and wherein the number of right side space values associated with each character is four.

10. The method of claim 7 wherein the memory device also stores data defining an in-run dimension and an out-run dimension for each character, and including said in-run and out-run dimensions of the involved characters in said processing of said right side and left side space values to produce said spacing data.

11. The method of claim 10 wherein each character of said font has its out-run dimension equal to its in-run dimension.

12. The method of claim 11 wherein the in-run dimension of all characters in said font are substantially equal to one another.

13. A method for establishing the spacing between adjacent characters in a system for generating text lines of characters through the use of a computer and an associated computer memory device, said method comprising:

providing a memory device storing data describing a font of characters of a given size and including first data defining in-run and out-run dimensions for each character, second data defining the shape of each character, and third data defining a plurality of space values at a number of different levels along the height of the character for both the left and right side of each character, the space values for the left side of a character for each level being related to the horizontal distance between the perpendicular line drawn through the leftmost extremity of the character and the adjacent edge of the character, and the space values for the right side of a character for each level being related to the horizontal distance between the perpendicular line drawn through the rightmost extremity of the character and the adjacent edge of the character, reading from said memory device data for a sequence of selected characters to be generated as a line of text, for each adjacent pair of selected characters of said sequence processing in said computer the right side space values of the left character and the left side space values of the right character in accordance with a first given program to produce kern amount data, such first given program being such that said kern amount data is related to the ability or inability of the two characters of said adjacent pair to partially overlap one another, for each adjacent pair of selected characters of said sequence processing in said computer the right side space values of the left character and the left side space values of the right character in accordance with a second program to produce openness factor data, said second given program being such that said openness factor data is related to the degree of open space existing between the right side of the left character of said adjacent pair and the left side of the right character of said adjacent pair, adding the out-run dimension of the left character of said adjacent pair to the in-run dimension of the right character of said pair to produce a fundamental spacing between said adjacent pair of characters, adjusting said fundamental spacing by said kern amount data and said openness factor data to produce an adjusted spacing, and generating a line of characters using for the generation of each character said second data defining its shape and using for the space between each adjacent pair of characters the adjusted spacing as provided by the foregoing steps.

14. A machine for generating text lines of characters, said machine comprising:

a memory device storing data describing a font of characters of a given size and including for each such character a first data set defining the shape of the character and a second data set defining approximately the shape of the left side of the character by way of a plurality of left side digital values and the shape of the right side of the character by way of a plurality of right side digital values, said left side digital values being related to the shape of the left side of said character at respectively different levels along the height of said character and said right side ditigal values being related to the shape of the right side of said character at respectively different levels along the height of said character, means for seleting a sequence of characters to be generated and for reading from said memory device the data relating to the sequence of characters, a processor for processing for each adjacent pair of said selected characters the plurality of right side digital values of the left character and the plurality of left side digital values of the right character in accordance with a program to produce spacing data, and means for generating a line of characters using for the generation of each character said first data set defining its shape and using for the space between each adjacent pair of characters said spacing data derived from said processing of said digital values.

* * * * *

UNITED STATES PATENT AND TRADEMARK OFFICE
CERTIFICATE OF CORRECTION

PATENT NO. : 4,591,999

DATED : May 27, 1986

INVENTOR(S) : David J. Logan

It is certified that error appears in the above-identified patent and that said Letters Patent are hereby corrected as shown below:

The title page should be deleted to appear as per attached title page.

Signed and Sealed this

Seventh Day of October, 1986

[SEAL]

*Attest:*

DONALD J. QUIGG

*Attesting Officer* *Commissioner of Patents and Trademarks*

United States Patent [19]

Logan

[11] Patent Number: 4,591,999

[45] Date of Patent: May 27, 1986

[54] METHOD AND APPARATUS FOR AUTOMATICALLY SPACING CHARACTERS DURING COMPOSITION

[75] Inventor: David J. Logan, Glastonbury, Conn.

[73] Assignee: Gerber Scientific Products, Inc., Manchester, Conn.

[21] Appl. No.: 529,834

[22] Filed: Sep. 6, 1983

[51] Int. Cl.⁴ ........................ G06F 15/46; B41J 19/32

[52] U.S. Cl. .................................... 364/523; 33/18.2; 364/474

[58] Field of Search ............... 364/474, 523, 200, 900; 33/18 R, 18 B

[56] References Cited

U.S. PATENT DOCUMENTS

| | | | |
|---|---|---|---|
| 4,195,338 | 3/1980 | Freeman | 364/523 X |
| 4,257,711 | 3/1981 | Nakajima | 364/523 X |
| 4,342,096 | 7/1982 | McDewitt | 364/523 X |
| 4,367,588 | 1/1983 | Herbert | 33/18 R |
| 4,437,150 | 3/1984 | Dahlgren, Jr. et al. | 364/474 |

*Primary Examiner*—Felix D. Gruber

*Attorney, Agent, or Firm*—McCormick, Paulding & Huber

[57] ABSTRACT

In a computer implemented system for composing lines of text the spacing between each adjacent pair of characters is uniquely determined by processing, in accordance with a pregiven program, a number of digital "space" values related to the shapes of the facing sides of the involved characters. Starting with a uniform or near-uniform fundamental spacing between all adjacent pairs of characters the processing of the space values of a given pair of adjacent characters results in possible adjustments in this fundamental value to achieve a more aesthetically pleasing line of text. For each pair of adjacent characters the processing is a two-stage one with the first stage making an adjustment in the fundamental spacing if it is possible to overlap portions of the two characters and with the second stage making an adjustment which, aside from the possibility of overlapping, is dependent on the degree of openness or empty space present between the characters when fundamental spacing is used.

14 Claims, 15 Drawing Figures

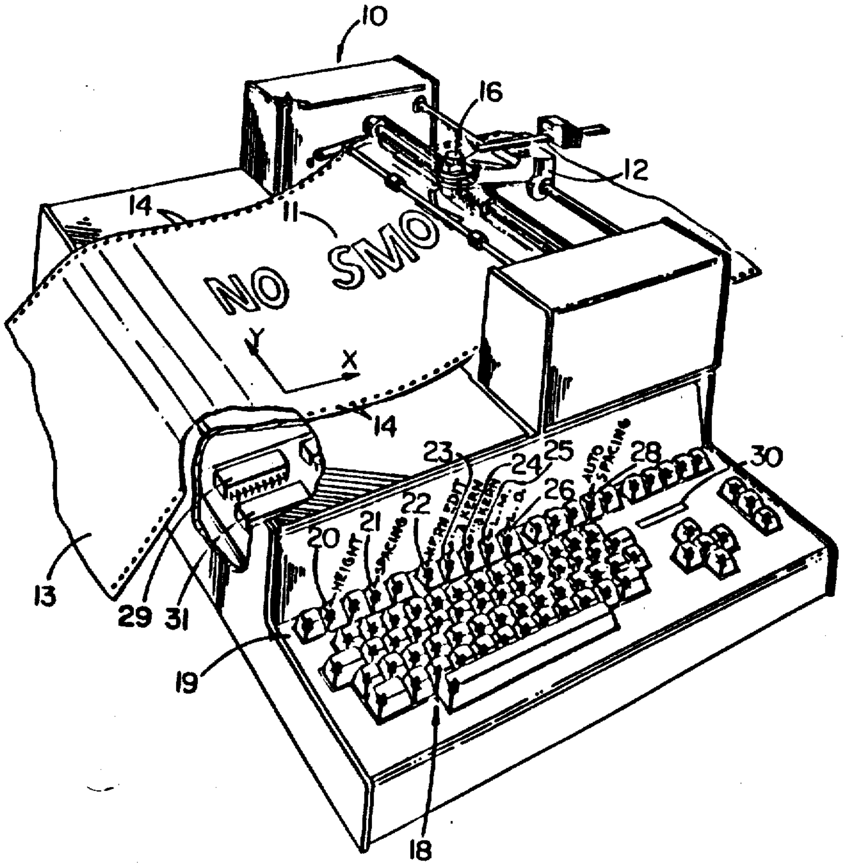

REEXAMINATION CERTIFICATE (1290th)

United States Patent [19]

[11] B1 4,591,999

[45] Certificate Issued May 29, 1990

Logan

[54] METHOD AND APPARATUS FOR AUTOMATICALLY SPACING CHARACTERS DURING COMPOSITION

[75] Inventor: David J. Logan, Glastonbury, Conn.

[73] Assignee: Gerber Scientific Products Inc., Manchester, Conn.

Reexamination Request:
No. 90/001,817, Jul. 25, 1989

Reexamination Certificate for:

| | |
|---|---|
| Patent No.: | **4,591,999** |
| Issued: | **May 27, 1986** |
| Appl. No.: | **529,834** |
| Filed: | **Sep. 6, 1983** |

Certificate of Correction issued Oct. 7, 1986.

[51] Int. Cl.[5] .......................... G06F 15/46; B41J 19/32

[52] U.S. Cl. .......................... 364/523; 33/18.2; 364/474.02; 364/474.22

[58] Field of Search ............... 364/474, 523, 200, 900; 33/18.1, 18.2; 400/303, 3, 9

[56] References Cited

U.S. PATENT DOCUMENTS

| | | | |
|---|---|---|---|
| 3,712,443 | 1/1973 | Mathews | 400/303 X |
| 4,195,338 | 3/1980 | Freeman | 364/523 X |
| 4,225,249 | 9/1980 | Kettler et al. | 400/303 X |
| 4,257,711 | 3/1981 | Nakajima | 364/523 X |
| 4,342,096 | 7/1982 | McDewitt | 364/523 X |
| 4,367,588 | 1/1983 | Herbert | 33/18.1 X |
| 4,437,150 | 3/1984 | Dahlgren, Jr. et al. | 364/474 |
| 4,467,525 | 8/1984 | Logan et al. | 33/18.2 |

OTHER PUBLICATIONS

Scott-Letrex Machine Development Corporation, Kerning Algorithm and Format, pp. 1-5.

*Primary Examiner*—Felix D. Gruber

[57] ABSTRACT

In a computer implemented system for composing lines of text the spacing between each adjacent pair of characters is uniquely determined by processing, in accordance with a pregiven program, a number of digital "space" values related to the shapes of the facing sides of the involved characters. Starting with a uniform or near-uniform fundamental spacing between all adjacent pairs of characters the processing of the space values of a given pair of adjacent characters results in possible adjustments in this fundamental value to achieve a more aesthetically pleasing line of text. For each pair of adjacent characters the processing is a two-stage one with the first stage making an adjustment in the fundamental spacing if it is possible to overlap portions of the two characters and with the second stage making an adjustment which, aside from the possibility of overlapping, is dependent on the degree of openness or empty space present between the characters when fundamental spacing is used.

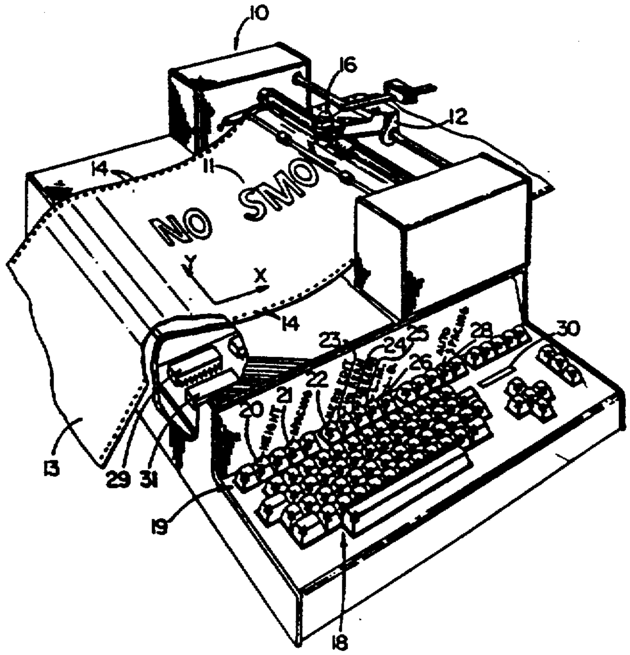

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 13 is confirmed.

Claim 14 is cancelled.

Claims 1–4 and 7 are determined to be patentable as amended.

Claims 5, 6 and 8–12, dependent on an amended claim, are determined to be patentable.

New claims 15–20 are added and determined to be patentable.

1. A method for establishing the spacing between adjacent characters in a system for generating text lines of characters through the use of a computer and an associated computer memory device, said method comprising:

providing a memory device storing data describing a font of characters of a given size and including for each such character a first data set defining the shape of the character and a second data set defining approximately the shape of the left side of the character by way of a plurality of left side digital *space* values and the shape of the right side of the character by way of a plurality of right side digital *space* values, *the number of said left side digital space values being equal to that of said right side digital space values,* said left side digital *space* values being related to the shape of the left side of said character at respectively different levels along the height of said character and said right side digital *space* values being related the shape of the right side of said character at *said* respectively different levels along the height of said character, reading from said memory device the data for a sequence of selected characters to be generated as a line of text, for each adjacent pair of selected characters of said sequence, processing in said computer said plurality of right side digital *space* values of the left character and said plurality of left side digital *space* values of the right character in accordance with a *given* program to produce spacing data *defining the spacing to be introduced between said each adjacent pair of selected characters*, and generating a line of characters using for the generation of each character said first data set defining its shape and using for the [space] *spacing* between each adjacent pair of characters said spacing data derived from said processing of said digital *space* values[.],

*said step of processing in said computer the right side digital space values of the left character and the left side digital space values of the right character including for each of said different levels adding the right side digital space value to the left side digital space value to provide a sum value for each level, combining said sum value for one level with said sum value for another level to provide an openness factor related to the openness of the space between said adjacent pair of selected characters, and using said openness factor in the generation of said spacing data.*

2. The method of claim 1 wherein the number of left side digital *space* values associated with each character is eight or less and wherein the number of right side digital values associated with each character is eight or less.

3. The method of claim 1 wherein the number of left side digital values associated with each character is four and wherein the number of right side digital *space* values associated with each character is four.

4. The method of claim 1 wherein said memory device also stores data defining an in-run dimension and an out-run dimension for each character, and including said in-run and out-run dimensions of the involved characters in said processing of said right side and left side digital *space* values to produce said spacing data.

7. A method for establishing the spacing between adjacent characters in a system for generating text lines of characters through the use of a computer and an associated computer memory device, said method comprising:

providing a memory device storing data describing a font of characters of a given size and including for each such character a first data set defining the shape of the character and a second data set defining a plurality of space values at a number of different levels along the height of the character for both the left and right sides of the character, the space values for the left side of a character for each level being related to the horizontal distance between the perpendicular line drawn through the leftmost extremity of the character and the adjacent edge of the character, and the space values for the right side of a character for each level being related to the horizontal distance between the perpendicular line drawn through the rightmost extremity of the character and the adjacent edge of the character, reading from said memory device the data for a sequence of selected characters to be generated as a line of text, for each adjacent pair of selected characters of said sequence processing in said computer the right side space values of the left character and the left side space values of the right character in accordance with a given program to produce spacing data *defining the spacing to be introduced between said each adjacent pair of selected characters*, and generating a line of characters using for the generation of each character said first data set defining its shape and using for the [space] *spacing* between each adjacent pair of characters said spacing data derived from said processing of said space values[.],

*said step of processing in said computer the right side space values of the left character and the left side space values of the right character including for each of said different levels adding the right side space value to the left side space value to provide a sum*

*value for each level, combining said sum value for one level with said sum value for another level to provide an openness factor related to the openness of the space between said adjacent pair of selected characters, and using said openness factor in the generation of said spacing data.*

*15. A method for establishing the spacing between adjacent characters, as defined in claim 1 and wherein said step of combining said sum values includes:*

*selecting the minimum sum value from said sum values,*

*decrementing each sum value by said minimum sum value,*

*summing all such decremented sum values to form a total value; and*

*dividing said total value by a given proportionality factor to provide said openness factor associated with said adjacent pair of characters.*

*16. A method as defined in claim 15 and wherein said step of using said openness factor includes:*

*establishing a starting fundamental spacing value for each adjacent pair of said selected characters of said sequence,*

*for each of said adjacent pairs of said selected characters of said sequence, using said openness factor to adjust said fundamental spacing to obtain an adjusted fundamental spacing,*

*subtracting said minimum sum value from said adjusted fundamental spacing to obtain a final fundamental spacing, and*

*using said final fundamental spacing as the spacing between said selected pair of characters.*

*17. A method as defined in claim 16 and wherein said step of using said openness factor to adjust said fundamental spacing includes:*

*multiplying said fundamental spacing by said openness factor to obtain an intermediate fundamental spacing value, and*

*multiplying said intermediate fundamental spacing value by a value related to the total amount of space said sequence of selected characters is to occupy to obtain said adjusted fundamental spacing.*

*18. A method as defined in claim 17 and wherein said memory device also stores data defining an in-run dimension and an out-run dimension for each character, and said fundamental spacing value for each adjacent pair of characters in said selected sequence of characters is established by adding the in-run dimension associated with the right character to the out-run dimension associated with the left character.*

*19. A method as defined in claim 18 wherein each character of said font has its out-run dimension equal to its in-run dimension.*

*20. A method as defined in claim 19 wherein the in-run dimension of all characters in said font are substantially equal to one another.*

* * * * *